(12) United States Patent
Subramanian et al.

(10) Patent No.: US 8,484,348 B2
(45) Date of Patent: Jul. 9, 2013

(54) METHOD AND APPARATUS FOR FACILITATING FULFILLMENT OF WEB-SERVICE REQUESTS ON A COMMUNICATION NETWORK

(75) Inventors: Siva Subramanian, Boston, MA (US); Franco Travostino, Arlington, MA (US)

(73) Assignee: Rockstar Consortium US LP, Plano, TX (US)

( * ) Notice: Subject to any disclaimer, the term of this patent is extended or adjusted under 35 U.S.C. 154(b) by 1403 days.

(21) Appl. No.: 10/794,675

(22) Filed: Mar. 5, 2004

(65) Prior Publication Data

US 2005/0198200 A1    Sep. 8, 2005

(51) Int. Cl.
*G06F 15/173*    (2006.01)

(52) U.S. Cl.
USPC ......................................... 709/226; 709/223

(58) Field of Classification Search
USPC ............................................. 709/226
See application file for complete search history.

(56) References Cited

U.S. PATENT DOCUMENTS

| | | | | |
|---|---|---|---|---|
| 6,728,748 B1* | 4/2004 | Mangipudi et al. | ............ | 718/105 |
| 6,748,413 B1* | 6/2004 | Bournas | ......................... | 718/105 |
| 7,792,714 B1* | 9/2010 | Mills et al. | ........................ | 705/35 |
| 2002/0042823 A1* | 4/2002 | DeBettencourt et al. | ..... | 709/224 |
| 2002/0194342 A1* | 12/2002 | Lu et al. | .......................... | 709/227 |
| 2002/0194343 A1* | 12/2002 | Shenoi et al. | ................. | 709/227 |
| 2003/0061404 A1* | 3/2003 | Atwal et al. | ................... | 709/328 |
| 2003/0070004 A1* | 4/2003 | Mukundan et al. | ........... | 709/330 |
| 2004/0003087 A1* | 1/2004 | Chambliss et al. | ........... | 709/226 |
| 2004/0111506 A1* | 6/2004 | Kundu et al. | ................... | 709/223 |
| 2005/0091653 A1* | 4/2005 | Willehadson et al. | ........ | 718/100 |
| 2007/0198688 A1* | 8/2007 | Smedberg et al. | ............. | 709/223 |

OTHER PUBLICATIONS

L. Harbaugh, *Balancing Dynamic Web Services Content*, XML & Web Services Magazine, Aug. 2002, 6 pages.
*SOAPstation—Reduces the Cost and Complexity of Web Services Deployment*, by Actional Corporation, 5 pages.
*High Availability Web Services White Paper*, Cisco Systems, 2000, 71 pages.

* cited by examiner

*Primary Examiner* — William Goodchild
(74) *Attorney, Agent, or Firm* — Anderson Gorecki & Rouille LLP (57) ABSTRACT

Fulfillment of web-service requests may be facilitated by intelligently load balancing the web-service requests between servers or server clusters configured to perform the requested web-service. Load balancing may be based on the type of request, target class of server, whether the request is likely to spawn any subsequent requests, relevant historical information, other requests, current and anticipated work load on the servers, the current ability of the servers to handle additional requests, the numbers type and schedule of requests in a queue waiting to be allocated to one or more of the servers, and numerous other factors that may affect the servers' ability to process the request. Requests may be classified to enable historical correlation between how servers have handled previous requests and the present request. Additionally, requests may be scheduled for future execution and monitored during execution.

16 Claims, 3 Drawing Sheets

METHOD AND APPARATUS FOR FACILITATING FULFILLMENT OF WEB-SERVICE REQUESTS ON A COMMUNICATION NETWORK

BACKGROUND OF THE INVENTION

1. Field of the Invention

The present invention relates to communication networks and, more particularly, to a method and apparatus for facilitating fulfillment of web-service requests on a communication network, for example by enabling load balancing of the requests to resources and tracking the requests on the resources.

2. Description of the Related Art

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as packets, frames, data cells, segments, or other logical associations of bits/bytes of data, between the network elements by utilizing one or more communication links between the network elements. A particular protocol data unit may be handled and modified by multiple network elements and cross multiple communication links as it travels between its source and its destination over the network.

Web servers are conventionally used to provide web pages in response to requests for content from network users. As networks have evolved, content switches were developed to provide enhanced services on the network, such as to allow these requests for content to be distributed between several web servers so that no individual web server would be overloaded with user requests. Distributing requests between several web servers has become known as "load balancing." Several methods have been developed to distribute web user content requests, such as a round-robin method in which the web servers are designated to service requests in a particular order and a modified round-robin method in which particular web servers are designated more frequently than other web servers. Since the user-generated requests generally all involve transactions that are of relatively uniform size and can be handled in a real-time manner, this type of load balancing scheme generally works fairly well for user-to-network interactions.

As networks have evolved, the concept of web-service has been developed. Web-service is a mechanism to support computer-to-computer transactions. These transactions may involve relatively complex computations, database accesses, and may require other network transactions to be generated or invoked. For example, a web-service may enable a computerized inventory system to maintain an inventory log, interrogate depletion of the inventory at various stations or monitoring points, and order new inventory by interfacing another computing system as necessary. Typically, conventional web-service use Simple Object Access Protocol (SOAP) and extensible Markup Language (XML) to initiate and participate in computer-to-computer transactions, although the invention discussed below will not be limited to only using these particular protocols.

As the transactions become more complex, and more resource and time intensive, a simple round-robin or modified round-robin approach becomes insufficient. Specifically, it may be that a particular transaction requires a significant amount of processor time whereas other transactions require significantly less processor time. As networks become more diverse, tasking the client application with selecting an appropriate server is not feasible as often the clients don't have the capability to monitor server loads and request specific servers, or are not provided with sufficient information to allow them to make an informed decision. Accordingly, it would be advantageous to enable web-service requests to be load balanced across web servers forming the web resources more intelligently.

Additionally, as web-service requests increase in size and complexity, it may become necessary to split the requests into several segments and split those segments between several different servers. Similarly, a single web-service request may spawn other sub-requests that need to be serviced by other servers or on other resources. In this environment, it would be advantageous to enable web-service requests to be managed, monitored, and/or tracked so that progress of the request may be determined across the several servers and the network could provide update responses to the client regardless of the platform being used to implement the request.

SUMMARY OF THE INVENTION

The present invention overcomes the above-mentioned and other drawbacks by providing a method and apparatus for facilitating requests for web-services, on-demand computing, and grid resources, for example by enabling load balancing of the requests to resources and tracking the requests on the resources. According to one embodiment of the invention, a content switch is provided with a web-service facilitator to enable web-service requests to be intercepted, analyzed, and intelligently load-balanced to servers within a server farm, between server clusters, or between server clusters and then between servers within the server cluster forming the web-resource of interest to the request. The web-service facilitator may collect historical data and use the historical data to more accurately predict how much server resources will be required to fulfill the request. The web-service facilitator may also include many other features, such as a scheduler configured to enable the web-service request to be scheduled for future execution and tracking mechanism configured to enable the web-service requests to be tracked as it is processed by the web-resource, and as secondary and sub-secondary requests are generated and cause secondary and sub-secondary responses to be generated. Other manners of facilitating web-service requests may be included as well and the invention is not limited to these several examples. While the invention will be discussed herein in connection with web-service requests, the invention is not limited to this embodiment as it also may be applied to facilitating requests for on-demand computing and grid resources.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

According to one embodiment of the invention, a content switch or other content-aware network element is configured to intercept web-service requests and intelligently load balance the web-service requests between servers configured to perform the requested web-service. Embodiments of the invention may include numerous features, such as the ability to perform load balancing based on the type of request, the target class of server, whether the request is likely to spawn any subservient requests, statistical information associated with how particular servers have handled other similar previous requests, the pending requests and work load on the servers, the current ability of the servers to handle additional requests, the numbers type and schedule of requests in a queue waiting to be allocated to one or more of the servers, and numerous other factors that may affect the servers' ability to process the request.

Figure 1:
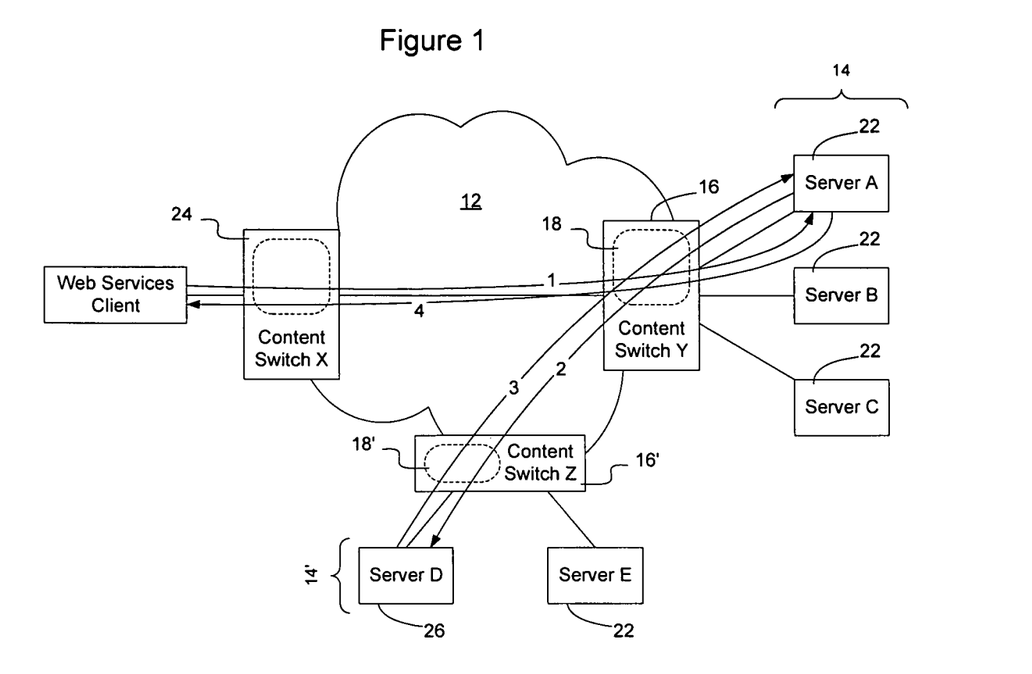
FIG. 1 is a functional block diagram of a network containing one or more content switches configured to facilitate fulfillment of web-service requests according to an embodiment of the invention.

FIG. 1 illustrates a network containing one or more content switches configured to facilitate fulfillment of web-service requests, such as to enable the web-service requests to be load balanced between multiple resource servers and/or to enable the resource request to be monitored/tracked on the network according to an embodiment of the invention. As shown in FIG. 1, in a conventional web-service context, a web-service client 10 seeking to initiate a transaction issues a request (arrow 1) across a communication network 12 such as the Internet. The invention is not limited to an implementation that operates over the Internet, however, as other network infrastructures may be used as well. The target of the request typically will be a resource 14 capable of fulfilling the request.

According to an embodiment of the invention, a content switch 16 on the communication network is configured to interface the resource 14 to the network and to intercept communications between the web-service client 10 and resource 14. As described in greater detail below, the content switch 16 may contain a web-service facilitator 18 to enable the content switch 16 to perform enhanced services in connection with facilitating the fulfillment web-service requests on the communication network.

One aspect of the web-service facilitator may enable the content switch 16 to implement load balancing between servers 20 or other computer environments associated with the resource 14 to enable requests to be intelligently allocated to one of the servers. Another aspect of the web services facilitator may enable the content switch to monitor the progress of the web-service requests and inform the web-service client of the progress of the request. These and other aspects in which the web-service facilitator 18 may facilitate fulfillment of web-service requests will be discussed below.

Assume, in the embodiment illustrated in FIG. 1, that the content switch 16 has directed the web-service request to server A in resource 14. This server may be able to fulfill the request on its own or may be required to spawn secondary requests to other web-service resources. In the example illustrated in FIG. 1, the server A has spawned a secondary request (arrow 2) to another resource 14'. The secondary resources may be interfaced to the network using a content switch 16' having a web-service facilitator 18' in much the same way as the primary resource 14 is interfaced to the communication network. If the secondary resource needs to issue tertiary requests it will do so as well. This process may iterate until all the necessary resources are marshaled to fulfill the primary request.

When the secondary resource has completed its portion of the secondary request, it passes the secondary result (arrow 3) back to the requesting primary web-service resource 14. Where tertiary and sub-tertiary requests have been spawned, the results of these requests may be passed back to the secondary resource 14' or may be passed directly to the primary web-service resource 14. The primary web-service resource 14 will then respond to the web-service client 10 with the result from the primary request (arrow 4). Optionally, the other web-service marshaled to work on the web-service request may also respond directly to the web-service client.

Figure 2:
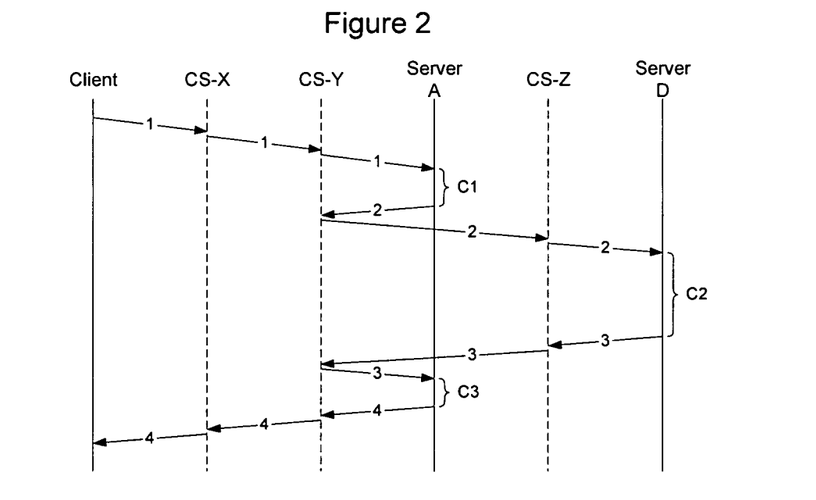
FIG. 2 is a program flow diagram illustrating execution of a web-service request on the network of FIG. 1.

FIG. 2 illustrates a flow diagram showing the execution of a web-service request on the network of FIG. 1. As shown in FIG. 2, when a client issues a web-service request, the request is passed toward a resource server A (arrow 1) through content switch X and content switch Y, at least one of which include a web-service facilitator 18. The resource server A will operate on the request for a period of time (C1). The resource server A may then determine that it needs access to a secondary resource, server D, and pass a secondary request (arrow 2) to resource server D. Since server A is interfaced with content switch Y, the request will pass through content switch Y, which will then pass the request toward server D via content switch Z. Resource server D will operate on the secondary request for a period of time (C2) and pass the result of the secondary request (arrow 3) back to resource server A. The result will be passed via content switches Z and Y in the reverse manner as the secondary request. Resource server A may then process the request using the secondary result for a period of time (C3) and finally issue a result (arrow 4) to the client. The result will be passed through the network via content switches Y and X. In this embodiment, the same server was used to process the request before and after spawning the secondary request. The invention is not limited in this regard, as different resource servers may be used to serve the request. For example, server A may be used to serve the request initially, and then server B may be used to service the request upon receipt of the result from the secondary web-server response (assuming appropriate coordination and transfer of data between the servers A and B). The invention is not limited therefore to a particular implementation as this figure is intended to illustrate the nature in which a web-resource may require server resources over a period of time and over a sequence of different and possibly unrelated servers. Because the content switches X, Y, and Z handle the requests and results, they are able to manage, monitor, and track the web service request on the network.

As shown in this FIG. 2, allocation of a web-service request to a resource may spawn a complex series of events which may require the resource to operate on the request, stop operation on the request, and then resume operation on the request at an undetermined time in the future. According to an embodiment of the invention, the content switch with web-service facilitator may intelligently determine the anticipated sequence of events associated with the request and allocate requests to resources accordingly, taking into account not only the current load and current processor commitments, but the anticipated processor commitments associated with the other requests being handled by the web-service resource.

Figure 3:
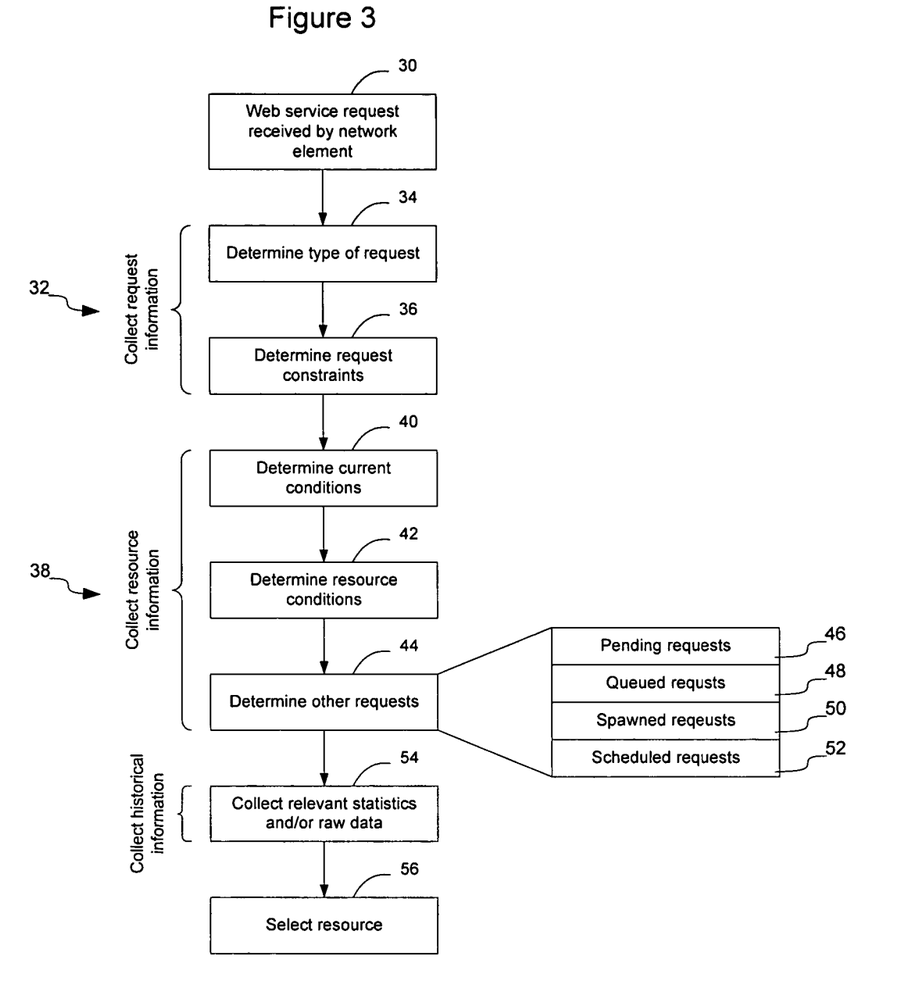
FIG. 3 is a flow chart illustrating a process of facilitating a web-service request by intelligently load-balancing the request to an available resource server.

FIG. 3 illustrates a flow chart explaining one method that may be utilized by a content switch and web-service facilitator 18 to implement load balancing of web-service requests to web-service resources and to provide other enhanced services on the communication network in connection with web-service. As shown in FIG. 3, when a web-service request is received by the content switch 16 (30), the web-service facilitator 18 initially collects information associated with the request (32). For example, the web-service facilitator may determine what type of request is embodied in the web-service request (34). Since the resource may be capable of handling many different types of requests and the content switch may be configured to interface more than one resource 14 to the communication network 12. For example, if the web-service request is directed at a database resource, the request may be a read request, a write request, or may require any number of additional types of operations. By inspecting the type of request, the web-service facilitator 18 can start to determine which resource may be most likely to be able to handle the request. Additionally, the web-service facilitator may determine constraints associated with the request (36) such as time constraints associated with execution, quality of service constraints, security parameters, and many other different constraints that may be specified by the client.

Determining the constraints may also involve determining other parameters associated with the request, such as the size of the request (i.e. what the request is actually seeking) and other parameters that may affect the resource's ability to service the request and/or the amount of effort the resource is likely to have to expend to process the request. Additionally, the web-service facilitator may determine whether it is likely that the request will spawn any secondary, tertiary, or sub-tertiary requests.

In addition to collect information about the request, the web-service facilitator may also collect information relating to the resource (38). The current state of the resources may include current conditions (40), such as the time of day, week, month, year, whether it is a holiday or weekend, the state of congestion on the network, and other factors that may influence servicing of the request. Additionally, the current resource information may include determining resource conditions such as the current processor load on the server (as estimated by the web-service facilitator or as communicated by the server), whether a server is currently experiencing failure or if the server is expected to be turned off for an upgrade or other scheduled outage.

The web-service facilitator may collect current processor load information or other resource information from the resource itself. According to an embodiment of the invention, the web-service facilitator may have facilities to enable it to interface a CPU monitor or engage in Simple Network Management Protocol exchanges with the web-resources to determine the current state of execution on the web resources. The invention is not limited to any particular way of ascertaining the current operating conditions on the resources.

The resources information also includes determining what other requests are being handled by the server, resource, or web-service facilitator that may impact or be impacted by assignment of the present request to one of the servers. For example, the web-service facilitator may look at pending requests (46), queued requests (48), spawned requests (50), scheduled requests (52) or any other requests that are being handled, monitored, or are otherwise known to the web-service facilitator.

In addition to request and resource information, the web-service facilitator will collect historical information (54) to help it make its load balancing determination or to help it determine if a particular sequence of events may be considered unusual. Historical data may include data gathered by the web-service facilitator associated with other similar requests, such as how long typical requests of this nature tend to take, an estimate of the burden associated with processing this request on the resource given how other requests of this nature have been processed previously, whether this request is likely to spawn any sub-requests, and numerous other historical facts that may be useful for the web-service facilitator to make an intelligent decision about how much processing time will be required to implement this resource request and the timing associated with processing this request.

For example, the web-service facilitator may learn from processing and tracking requests on the web-service resources that a particular type of request requires a relatively large block of processor time for a relatively short period of time, while another type of web-service request spawns a large number of sub-requests and therefore requires a relatively small amount of processor time on the primary resource but is likely to take a relatively long time to execute. In this instance it may be better to cause the first types of requests to be handled by one or a set of primary resources and to cause the second types of requests to be handled by another set of primary resources. The invention is not limited to this particular example, as many different types of network request and much more sophisticated analysis may be performed in connection with interfacing the requests to the web-service resources.

Once the relevant data has been collected from the request, target resource(s) and from historical records, the web-service facilitator 18 may make a determination as to which resource and optionally which server within which resource should be used to satisfy the request (56). There are many ways of using the collected data to make a load balancing determination and the invention is not limited to a particular embodiment. For example, the web-service facilitator may use the collected request information and resource information and use that information to determine the amount of processor resources were required to process previous similar requests under similar situations. The statistical and/or raw historical data may be used in this context.

Optionally, to make it easier to correlate request information, resource information and historical information, classification may be used to cause the requests to fall within one of a predetermined number of request classifications and optionally within one or more sub-classifications within the classification. Classifying requests makes it easier to identify similar previous requests. Similarly, current resource information may be classified into a series of categories. Breaking down the total set of possible number of available states into classes and sub-classes increases the likelihood that raw or statistical data will be available that may be identified as having been conceptually similar to the current request. The invention is not limited in this regard, however, as any number of ways may be used as well to correlate request, resource, and historical data to determine an estimated resource usage value, which may then be used to select from between the available resources.

Optionally, for time-sensitive and important requests, the web-service facilitator 18 may determine that it is advantageous to cause two different servers to operate on the request simultaneously to cooperatively execute the request or to race to fulfill the request. The invention is not limited to this embodiment, however.

The web-service facilitator may perform additional functions in connection with the web-service request as well, and the invention is not limited to a content switch that simply load balances web-service requests to web-service resources. For example, the content switch may also perform additional services on the communication network, such as security services, on behalf of the web-service client or web-service resource. Examples of security services include authentication determination, authorization determination, establishing accounting entries, performing firewall services, and numerous other security services.

Optionally, the web-service facilitator may also monitor the progress of the web-service request, for example where the web-service request may take a not insignificant period of time to execute on the resource or where the web-service request is likely to spawn secondary or sub-secondary requests. The web-service facilitator may also monitor the progress of the request to update its databases of historical data based on the execution of this particular request on the selected web-resource(s). These and other features of several embodiments of the invention will be discussed in greater detail below in connection with FIG. 4.

Figure 4:
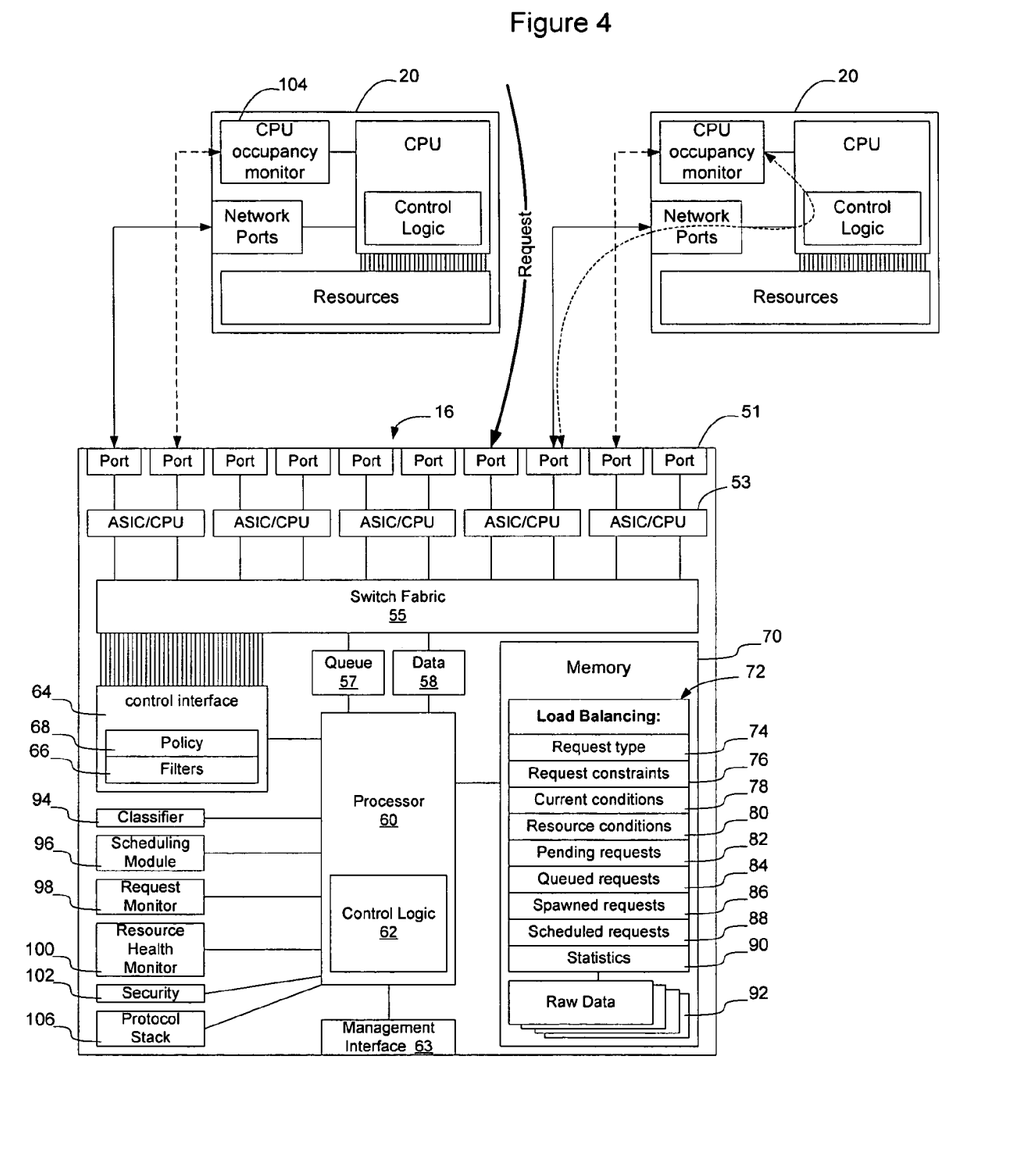
FIG. 4 is a functional block diagram of a content switch including a web-service facilitator interfaced with web-service resources according to an embodiment of the invention.

FIG. 4 illustrates a content switch having a web-service facilitator instantiated thereon and interfaced to two servers configured to handle web service requests on the communication network. As shown in FIG. 4, the content switch 16 generally includes network ports 51 configured to interface with the network 12 and servers 20 configured to provide web-service resources 14. The ports 51 are interconnected by ingress processors 53 to a switch fabric 55. The ports, ingress processors, and switch fabric form a data plane within the content switch and enable the content switch to handle data packets on the network. One or more packet queues 56 may be connected to the switch fabric to store packets or other protocol data units pending transmission by the network element 16. Additionally, to enable request data to be collected from traffic passing through the switch fabric, a data queue 58 may be provided to receive selected data from the switch fabric identified as being relevant to the web services facilitator.

The switch fabric 55 is controlled by a processor 60 containing control logic 62. In the embodiment illustrated in FIG. 4, the processor 60 may control the switch fabric directly or through a control interface 64 configured to implement filters 64 and other policy rules 66 on the switch fabric 55. For example, the processor may cause one or more filters to be configured on the switch fabric such that packets received on one of the network ports and containing a particular combination of features may be directed to a packet inspection module or to the control plane containing the processor 60 for inspection.

Interfaced to the control logic or resident thereon is a web-service facilitator software package including program code configured to enable the content switch to perform the functions associated with the web-service facilitator described above. The web-service facilitator software may be stored in memory and interfaced to the processor 60, or may be loaded onto the processor 60 to enable the content switch 16 to perform the functions of the web-service facilitator. Optionally, the web-service facilitator may be maintained on a separate computing platform such as a blade server and interfaced to the content switch. The invention is not limited to any particular manner of implementing the web-service facilitator or any particular manner of associating the web-service facilitator to the content switch 16. Accordingly, the invention is intended to encompass any such variations.

A memory 70 containing data and instructions configured to enable the web-services facilitator to be instantiated on the processor 60 and control logic 62 is provided on the network element as well. The memory, in this embodiment, contains a web-service facilitator that is configured to facilitate fulfillment of web-service requests by enabling requests to be load-balanced between several servers associated with a resource.

In the embodiment illustrated in FIG. 4, the load balancing software includes several subroutines configured to collect and/or analyze data associated with the request, resource, or historical data. For example, in the embodiment illustrated in FIG. 4, the load balancing software 72 includes a request type subroutine 74 configured to determine the type of request received by the web-services facilitator. A request constraints subroutine 76 is included to determine and record constraints associated with the request. A current conditions subroutine 78 is provided to ascertain the current conditions attendant to the request, such as the time at which the request is to execute, etc. The current conditions subroutine may be used to determine the conditions at the time the request is received where the request is to be executed in real time, or may determine the current conditions when the request is expected to execute, for example where the request is to be executed at a particular time in the future.

A resource conditions subroutine (80) is provided to determine the conditions of the resource at the time the resource is to be executed. As this subroutine looks at actual operational parameters of the requested resource or servers associated with the resource, this subroutine only looks at present conditions, although it may be possible to make informed guesses as to what the conditions of the servers are likely to be at a predetermined future point in time.

A pending request subroutine 82, queued request subroutine 84, spawned request subroutine 86 and a scheduled request subroutine 88 all keep track of different types of requests that are being processed by the resource or are scheduled to be processed by the resource. Optionally these subroutines may be collapsed into a unified request subroutine.

A statistics subroutine 90 collects raw data from a raw data database 92 to obtain meaningful abstraction of the raw data for use by the load balancing software to determine an estimated resource usage value, which may be used to select one of the resources to handle the request.

According to one embodiment of the invention, the web-service facilitator may include tables of raw data 92 to retain information about requests that have been serviced by the content switch to thereby establish a database of information. Optionally, this database of historical information may include both raw data and statistical data, the raw data being results obtained from individual requests and the statistical data being data derived from the raw data. Examples of types of data that may be collected by the web-service facilitator include request type, the request magnitude, the number and type of spawned secondary/sub-secondary requests, the total time to receive a response, the amount of processor time attributed to the request by the resource, the type of server at the resource that was used to process the request, the state of the server at the time the request was allocated to the server, the amount of congestion on the network at the time the request was sent to the server, what time of the day the request was sent to the resource, the day of the week or particular other time period during the week/month/year when the request was sent to the resource, and many other factors that may help the web-service facilitator estimate the amount of processor resources required to fulfill the request and establish the optimum server to handle the request.

As mentioned above, the raw data collected from experiences with allocating individual or groups of requests to the users may be collected and then abstracted periodically or on an on-going basis to obtain statistical information. The statistical information may be more useful for the web-service facilitator as it may provide a faster way to determine how a request with particular parameters may be handled.

The load balancing software may contain additional modules as well, or the network element may contain additional modules configured to supplement the load balancing software to enhance the capabilities of the network element and provide additional functionality to the web service facilitator. These modules (94-102 and 106) discussed below may be integrated with and/or form part of the load balancing software 72 or may be self contained software or hardware modules configured to implement particular aspects of the web service facilitator. For example, the web-service facilitator may include a classifier 94 configured to classify requests, and current conditions into categories, and sub-categories. The statistical information, according to this embodiment, may be organized by category and sub-category as well, to enable a fast correlation between the received request, conditions, and statistical information to take place. For example, the content switch may categorize the request into a database request, and into a sub-category database read. Within that sub-category, it may be determined that the request will need to perform approximately 200 database read operations to fulfill the request. From the raw data associated with other database read operations, statistical information may be collected indicating that database read operations take on average 1 ms to complete when the server is not congested, and that the database read operations take on average 5 ms to complete when the server is congested. Given the time at which the request is received the web-service facilitator may determine which servers are likely to be congested, or if all the servers are likely to be congested. Depending on the result of these operations the web-service facilitator may determine that it will take anywhere between 200 and 1000 ms to complete the request. This information may be used to determine which server would best be able to handle this request. Additionally, this information may be stored in another module in the web-service facilitator to enable the web-service facilitator to have better knowledge of the likely load on that server in connection with allocating other requests to the resource. This example is not meant to limit the scope of the invention but rather to explain an example of how the web-service facilitator may be put to use in a real-life example. The invention extends beyond this example to implementations configured to utilize the information available to the web-service facilitator to perform load balancing and other services on behalf of the web-service resources.

The web-service facilitator may also include a scheduling module 96 to schedule execution of requests on the resources. For example, it may be that the request does not need to be executed in real time or was requested to be executed at a particular time in the future. Including a scheduling module enables the web-service facilitator to schedule constrained, unconstrained, and under-constrained requests and adjust the schedules to accommodate newly received requests while also allowing requests to be scheduled for future execution. Additionally, where the resources are overloaded servicing other requests, the scheduling module may act as a queue to hold requests until they may be passed to the servers without risking that the servers may drop the requests for lack of capacity and to prevent the servers from experiencing a failure due to the overload condition.

In one embodiment, the web-service facilitator may include a request monitor 98 to enable the web-service facilitator to monitor the ongoing status of the request after it has been submitted to the resource for execution. For example, it may be that a given request will require several attendant resources to participate to prepare a response to the request. This may be done for example as discussed above by issuing sub-requests to other resources, etc. The request monitor may monitor these sub-requests and match the secondary and sub-secondary responses with the primary request to monitor the progress of the primary and secondary requests. This may be done, for example, by setting appropriate filters and listening for responses to the various sub-requests. The request monitor may also be configured to perform update functions to update the client of the progress of the request periodically, upon request, or upon occurrence of a particular or series of events associated with the request.

Additionally, the web-service facilitator may include a resource health monitor 100 to enable the web-service facilitator to monitor the state of the network elements configured to implement the request or other associated network elements. In this embodiment, the resource health monitor may be configured to intervene where it appears an unexpected pattern of events associated with a request has transpired. For example, the resource health monitor may detect that a secondary response to a secondary request has not been received within a particular period of time after the secondary request was sent to the secondary resource. In this event, the resource health monitor may conclude, based on the period of time and historical response information, that the secondary request has gotten lost or dropped somewhere in the secondary resource or on the network interconnecting the content switch with the secondary resource. This may cause the resource health monitor to take action or alert the web-service facilitator to the potential problem, which may be used to initiate an inquiry or to initiate a resubmission of the secondary request.

The web-service facilitator may also include a management function to enable it to be interfaced by a network management program to set default values, parameters, and to otherwise enable the content switch to be managed for operation on the network or in connection with particular resources available through it.

The web-service facilitator may also include a security module configured to perform security services on the network. The security module may perform AAA (Authorization, Authentication, and Accounting) services, encryption services, firewall services, or numerous other security services on the network. For example, the owner of the web-service resource may wish to only allow access to the resource to particular users or to requests that have been formatted in a particular manner. The security module 102 may be used in this example to implement these access restrictions. Numerous other security operations may be implemented as well and the invention is not limited to this particular example.

Optionally, as illustrated in FIG. 4, the resources 20 may participate in collecting data for use by the web-service facilitator. For example, the resources may include a CPU occupancy monitor 104 or other facility to enable processor time, request parameters, time of day, and other raw and/or statistical information to be collected and passed to the web-service facilitator 18. This information may be communicated to the content switch over a dedicated management port 63 which may be connected to a management network, or may be communicated over the data network used to interface requests to the resources. The invention is not limited to how the raw/statistical information is communicated between the resource and content switch.

The content switch may also include numerous other components configured to enable it to operate on the network. For example, the content switch may include a protocol stack 106 containing instructions and data relevant to communications protocols to enable it to participate in protocol exchanges on the network. The content switch may also include content switch software to enable it to perform packet inspection on filtered packets to learn the content of the packets being transported on the network.

The control logic of FIG. 5 may be implemented as a set of program instructions that are stored in a computer readable memory within the network device and executed on a microprocessor within the network device. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for facilitating fulfillment of web-service requests associated with computer-to-computer transactions on a communication network, the method comprising:
    receiving, by a content switch from a web-service client, a primary request for access to a web-service, the primary request being a web-service request generated by a computer as part of a computer-to-computer request for access to a resource associated with the web service;
    selecting, by the content switch, one of a plurality of web-service servers to handle the primary request;
    forwarding, by the content switch, the primary request to the selected web-service server; and
    monitoring, by the content switch, traffic generated by the selected web-service server for a secondary web-service request directed to a second web-service server, the secondary web-service request being related to the primary web-service request, the secondary web-service request being configured as a computer-to-computer request for access by the selected web-service server to a resource associated with the second web-service server to enable the selected web-service server to utilize the resource available via the second web-service server in connection with preparing a response to the primary web-service request; and
    collecting information associated with how requests are handled by particular servers;
    wherein collecting information comprises correlating request information and resource information at the time the primary request was forwarded to the web-service server; and
    wherein the resource information includes at least current conditions, resource conditions, and information about other requests.

2. The method of claim 1, wherein selecting comprises determining the type of request, the target class of the server, and whether the request is likely to span any secondary requests.

3. The method of claim 1, wherein the request information includes at least the type of request and request constraints.

4. The method of claim 1, further comprising the step of scheduling the request for submission to the web-service server at a scheduled time and wherein forwarding takes place at the scheduled time.

5. The method of claim 1, further comprising monitoring execution of the web-service request on the web-service server.

6. The method of claim 1, further comprising tracking the web-service requests on the communication network.

7. The method of claim 1, further comprising:
    upon occurrence of a secondary web-service request, monitoring the second web-service server for a response to the secondary web-service request.

8. A method for facilitating fulfillment of web-service requests associated with computer-to-computer transactions on a communication network, the method comprising:
    receiving, by a content switch from a web-service client, a primary request for access to a web-service, the primary request being a web-service request generated by a computer as part of a computer-to-computer request for access to a resource associated with the web service;
    selecting, by the content switch, one of a plurality of web-service servers to handle the request;
    forwarding, by the content switch, the primary request to the selected web-service server; and
    monitoring, by the content switch, traffic generated by the selected web-service server for a secondary web-service request directed to a second web-service server, the secondary web-service request being related to the primary web-service request, the secondary web-service request being configured as a computer-to-computer request for access by the selected web-service server to a resource associated with the second web-service server to enable the selected web-service server to utilize the resource available via the second web-service server in connection with preparing a response to the primary web-service request; and
    determining request information and resource information;
    wherein selecting comprises comparing the request information and the resource information with historical information to select the one of a plurality of web-service servers to handle the request; and
    wherein comparing the request information and the resource information with historical information comprises determining an anticipated processing time for the request.

9. A network element, comprising:
    a web-service facilitator configured to collect information associated with execution of web-service requests associated with computer-to-computer transactions by web-service servers, and to collect information associated with execution of sub-requests spawned by the web-service servers in connection with execution of the web-service requests, and use the collected information to perform load balancing of new web-service requests associated with new computer-to-computer transactions to the web-service servers; and a request monitor configured to collect the information by monitoring execution of the web-service requests on the web-service servers and by monitoring execution of the sub-requests spawned by the web-service servers in connection with execution of the web-service requests, and to provide the information to the web service facilitator to enable the web-service facilitator to use the information about the execution status of the web-service requests and sub-requests in connection with performing load balancing;

wherein the request monitor is further configured to perform update functions to update clients of the progress of execution of web-service requests; and wherein the sub-requests spawned by the web-service servers are computer-to-computer transactions related to the web-service requests, the sub-requests being configured as computer-to-computer requests for access by web-service servers to resources associated with secondary web-service servers to enable the web-service servers to utilize the resources available via the secondary web-service servers in connection with preparing responses to the web-service requests.

10. The network element of claim 9, further comprising network ports and a switch fabric configured to interconnect the network ports to enable data communications to take place between the network ports.

11. The network element of claim 9, wherein the web-service facilitator comprises load balancing software including a subroutine configured to ascertain data associated with the request, a subroutine configured to ascertain data associated with the resource, and a subroutine configured to ascertain relevant historical data, and wherein the load balancing software is configured to use the data associated with the request, data associated with the resource, and historical data to perform load balancing of new requests to the web-service servers.

12. The network element of claim 9, wherein the web-service facilitator comprises a scheduling module configured to enable web-service requests to be scheduled for execution on the web-service servers.

13. The network element of claim 9, wherein the web-service facilitator comprises a classifier configured to classify a request into a category, said category being selected from one of a plurality of possible categories.

14. The network element of claim 13, wherein the classifier is further configured to classify the request into a sub-category within said category, said sub-category being selected from a plurality of possible sub-categories.

15. The network element of claim 9, further comprising a resource health monitor configured to monitor the availability and current conditions of the web-service servers.

16. The network element of claim 9, wherein the request monitor is further configured to collect raw data about requests and generate statistical data from the raw data, said statistical data being associated with categories of requests.

* * * * *